(12) United States Patent
Cleodolphi et al.

(10) Patent No.: US 9,781,880 B2
(45) Date of Patent: Oct. 10, 2017

(54) CONTROL OF BASE CUTTER HEIGHT FOR MULTIPLE ROW SUGAR CANE HARVESTERS

(71) Applicant: CNH Industrial America LLC, New Holland, PA (US)

(72) Inventors: Daenio Cleodolphi, Piracicaba (BR); Jan Verstraete, Poperinge (BE); Adriano Fagundes, Curitiba (BR); Ramon Sarchi, Piracicaba (BR); Fabio Tanaka, Piracicaba (BR)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/898,400

(22) PCT Filed: Jul. 2, 2014

(86) PCT No.: PCT/US2014/045255
§ 371 (c)(1),
(2) Date: Dec. 14, 2015

(87) PCT Pub. No.: WO2015/003058
PCT Pub. Date: Jan. 8, 2015

(65) Prior Publication Data
US 2016/0135365 A1    May 19, 2016

Related U.S. Application Data

(60) Provisional application No. 61/842,264, filed on Jul. 2, 2013.

(51) Int. Cl.
*A01D 45/10*     (2006.01)
*A01D 34/00*     (2006.01)
(Continued)

(52) U.S. Cl.
CPC ......... *A01D 34/006* (2013.01); *A01D 41/141* (2013.01); *A01D 41/145* (2013.01);
(Continued)

(58) Field of Classification Search
CPC combination set(s) only.
See application file for complete search history.

(56) References Cited

U.S. PATENT DOCUMENTS 4,035,996 A  *  7/1977  Fernandez ............. A01D 45/10
                                                         56/13.9
5,157,904 A     10/1992  Otten et al.
(Continued)

FOREIGN PATENT DOCUMENTS

CN       102783308 A     11/2012
CN       202979681 U      6/2013
(Continued)

*Primary Examiner* — Alicia Torres
(74) *Attorney, Agent, or Firm* — Patrick M. Sheldrake

(57) ABSTRACT

A multiple row sugar cane harvester having automatic and independent control of multiple base cutters utilized to severe sugar cane stalks in adjacent rows. Position sensors sense the height of the base cutters relative to the chassis of the sugar cane harvester and feed the signals to a controller for adjusting the height to a preselected level. The base cutters are individually driven by hydraulic motors through individual hydraulic circuits and the operating pressure is sensed and fed to the controller for determining whether a choke condition exists. A load sensor is incorporated between the linkage and the sugar cane harvester chassis for determining whether the base cutters have ground contact to elevate the base cutters.

4 Claims, 5 Drawing Sheets

(51) Int. Cl.
  *A01D 41/14*     (2006.01)
  *A01D 63/02*     (2006.01)
  *A01D 69/03*     (2006.01)
  *A01D 101/00*    (2006.01)

(52) U.S. Cl.
  CPC ............ *A01D 45/10* (2013.01); *A01D 63/02* (2013.01); *A01D 69/03* (2013.01); *A01D 2101/00* (2013.01)

(56) References Cited

U.S. PATENT DOCUMENTS

| | | |
|---|---|---|
| 5,485,716 A | 1/1996 | Baker |
| 5,704,200 A | 1/1998 | Chmielewski, Jr. et al. |
| 6,272,819 B1 * | 8/2001 | Wendte ................ A01D 41/127 460/6 |
| 6,588,187 B2 | 7/2003 | Engelstad et al. |
| 7,401,455 B1 | 7/2008 | Cleodolphi |
| 7,707,811 B1 | 5/2010 | Strosser |
| 8,051,632 B2 | 11/2011 | Strosser |
| 8,452,501 B1 | 5/2013 | Lange et al. |
| 8,572,938 B2 | 11/2013 | Deneault et al. |
| 2006/0026939 A1 * | 2/2006 | Kormann ............. A01D 41/141 56/10.2 E |
| 2006/0242935 A1 * | 11/2006 | Rayfield .............. A01D 41/141 56/10.2 E |
| 2008/0155953 A1 * | 7/2008 | Cleodolphi ............ A01D 45/10 56/10.2 E |
| 2013/0116894 A1 | 5/2013 | Perez-Iturbe et al. |

FOREIGN PATENT DOCUMENTS

| | | |
|---|---|---|
| DE | 2654141 A1 | 6/1978 |
| DE | 3213848 A1 | 10/1983 |
| GB | 1481083 A | 7/1977 |
| WO | 2013003925 A2 | 1/2013 |

* cited by examiner

CONTROL OF BASE CUTTER HEIGHT FOR MULTIPLE ROW SUGAR CANE HARVESTERS

This application is the US National Stage filing of International Application Serial No. PCT/US2014/045255, filed on Jul. 2, 2014 which claims priority to U.S. Provisional Applications with Serial Numbers 61/842,264, filed Jul. 2, 2013, each of which is hereby incorporated by reference in its entirety.

BACKGROUND OF THE INVENTION

1. Field of the Invention

The present invention relates to a sugar cane harvester, and, more particularly, to harvesters of the type that process multiple rows.

2. Description of the Related Art

In the harvesting of sugar cane one of the essential elements of the apparatus is a base cutter. This is the component that severs the stalk to be carried by the harvester into a sequence of processing steps. It is desirable in the utilization of the base cutter to cut the sugar cane stalks as close to the ground as possible without choking the root and the ground. Owing to the variations in terrain and soil composition it is necessary to adjust the height of the base cutter to an optimal height during field operation. A number of prior approaches have utilized various devices to control the height of the base cutter. These may take the form of optical position sensors and other approaches known in the art.

The problem of adjusting base cutter height is made more challenging when the harvester is processing multiple rows of sugar cane stalks in order to gain productivity. Currently, two rows of sugar cane stalks are proposed to be processed but it is contemplated that additional rows may be processed by future machines. With such multiple row processing, the instantaneous adjustment of the base cutter may dynamically vary during processing in the field and the height of one of the base cutters will not necessarily be the height of the other. Previous attempts have been made to adjust the height but they involve systems that are either overly complicated or simply approximate the desired base cutter height. What desired in the art, therefore, is the control of base cutter height for a multiple row sugar cane harvester that avoids the above problems and is effective in dynamic field conditions.

SUMMARY OF THE INVENTION

In one form, the present invention is embodied in a sugar cane processing apparatus having multiple base cutters positioned adjacent the surface of a field for severing sugar cane stalks at individual preselected heights. A linkage positions each base cutter at a variable height relative to the surface of the field and an actuator variably positions the base cutter at a preselected distance from the surface of the field. Position sensors generate signals proportional to the position of the base cutters relative to the field surface. Load sensors on the linkage determine the load imposed on the base cutter by contact with the field surface. A controller coordinates the position of the signal reflecting the position of the base cutter and the load on the actuating linkage for maintaining the base cutter at a preselected height.

In another form of the invention, the above combination includes a hydraulic motor powering the base cutter and a hydraulic system for supplying fluid to the hydraulic motor and a pressure sensor for generating a single reflecting pressure above a given level to indicate choking and feeding that signal to the controller for elevating the height.

In yet another form, the invention is a sugar cane harvester having a chassis propelled for movement across a field in a forward direction. The chassis has sugar cane row dividers and a downstream base cutter. A sugar cane processing apparatus is positioned downstream of the base cutter. The sugar cane harvester has linkage for variably positioning the base cutters at a preselected distance from the field surface. Motors are provided for each base cutter. A position sensor is employed in the linkage to generate a signal indicating the position of the base cutter relative to the ground and a load sensor is positioned in the linkage to determine the presence or absence of a load reflecting contact with the ground. The load sensor sends a signal to a controller for controlling the actuator to variably position the base cutter in response to the signals from the sensors.

In another embodiment, the sugar cane harvester includes a hydraulic motor operating the base cutters and a pressure sensor for generating a signal to the controller when pressure above a given level indicates a choking affect thus elevating the base cutter relative to the field surface.

In yet another form, the invention is a method for harvesting multiple rows of sugar cane stalks utilizing multiple base cutters. The method includes the steps of positioning the base cutters independently to a given position relative to the field surface and sensing the position relative to the field surface. The load on the base cutters is determined and utilized to elevate the base cutters in the event of choking.

In another form, the method includes the step using hydraulic pressure to drive into rotation the base cutters and determining the driving fluid force so that force above a given level indicates choking with the respect to the sugar cane stalk and which causes the base cutters to be elevated relative to the field surface.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Figure 1:
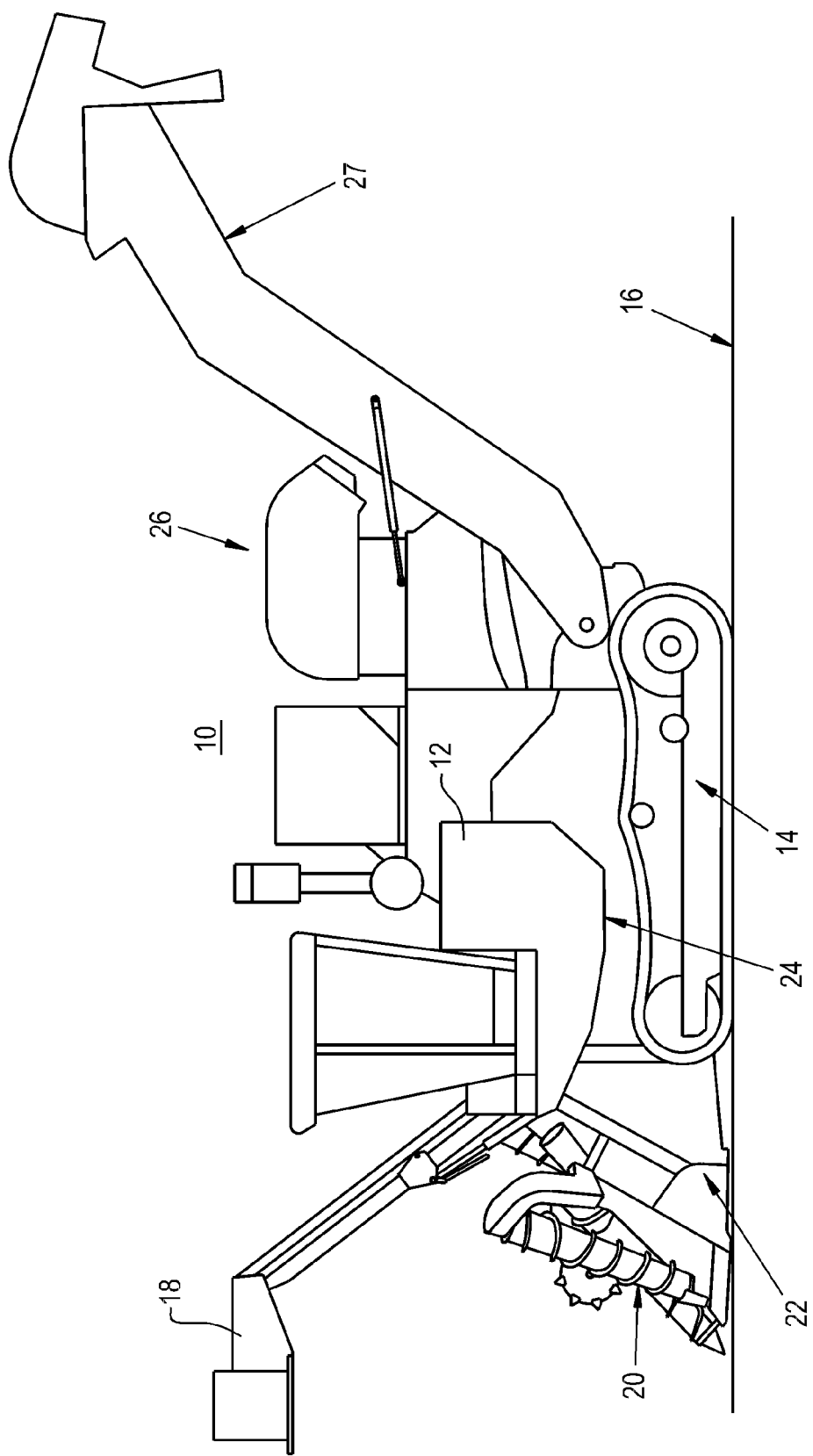
FIG. 1 is a side elevation view of a sugar cane harvester embodying the present invention.

The additional attachments show the method steps in practicing the present invention.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

FIG. 1 shows a sugar cane harvester 10 including a chassis 12 having endless tracks 14 for powered directional movement across a field 16. The chassis 12 is powered by an appropriate form of engine, usually an internal combustion engine. The endless tracks 14 provide movement across the field 16 as well as steering. It should be apparent to those skilled in the art that a wide variety of propulsion units as well as ground movement arrangements such as wheels may be employed for the chassis 12 so that it moves across a field to harvest sugar cane.

A topper assembly 18 extends forward from the chassis 10 to sever the tops of sugar cane stalks to facilitate harvesting. A crop row divider assembly 20 includes a pair of rollers that divide the crops and move the sugar cane stalk in a downstream direction relative to the forward movement of chassis 12 where the base of the stalks is cut by a pair of base cutter assemblies 22. The base cutter assemblies 22 usually consist of overlapping rotating disks into which the stalks are fed to sever them at their base. The cut stalks, along with unwanted material, are moved in a downstream direction to feed mechanism 24 that delivers the material in billets to equipment, generally indicated by 26, that cleans unwanted material and other crop pieces from the billets and extracts further trash to ultimately place them in a form to be delivered to a crop wagon (not shown) by a conveyor 27.

Figure 2:
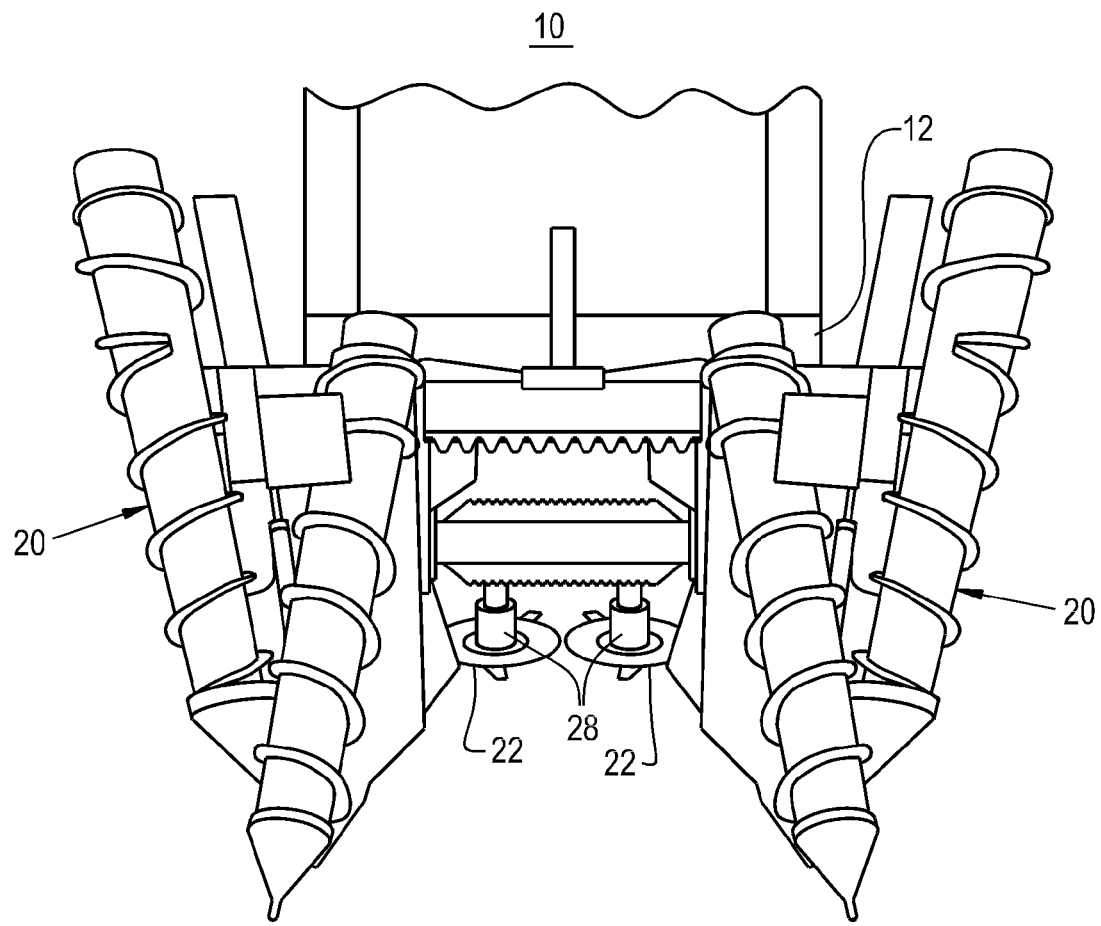
FIG. 2 is a front view of the sugar cane harvester of FIG. 1.

The sugar cane harvester of FIGS. 1 and 2 is one that is adapted for processing multiple rows of sugar cane, such as the illustrated two rows. For this purpose, the sugar cane harvester has a pair of right and left base cutters 22 to provide independent control of the cut height of the base cutter. The base cutters 22 in addition to being displaceable upwards and downwards relative to the surface of the field 16 are driven by hydraulic motors 28 shown in schematic fashion in FIG. 2 and in FIG. 5.

Figure 5:
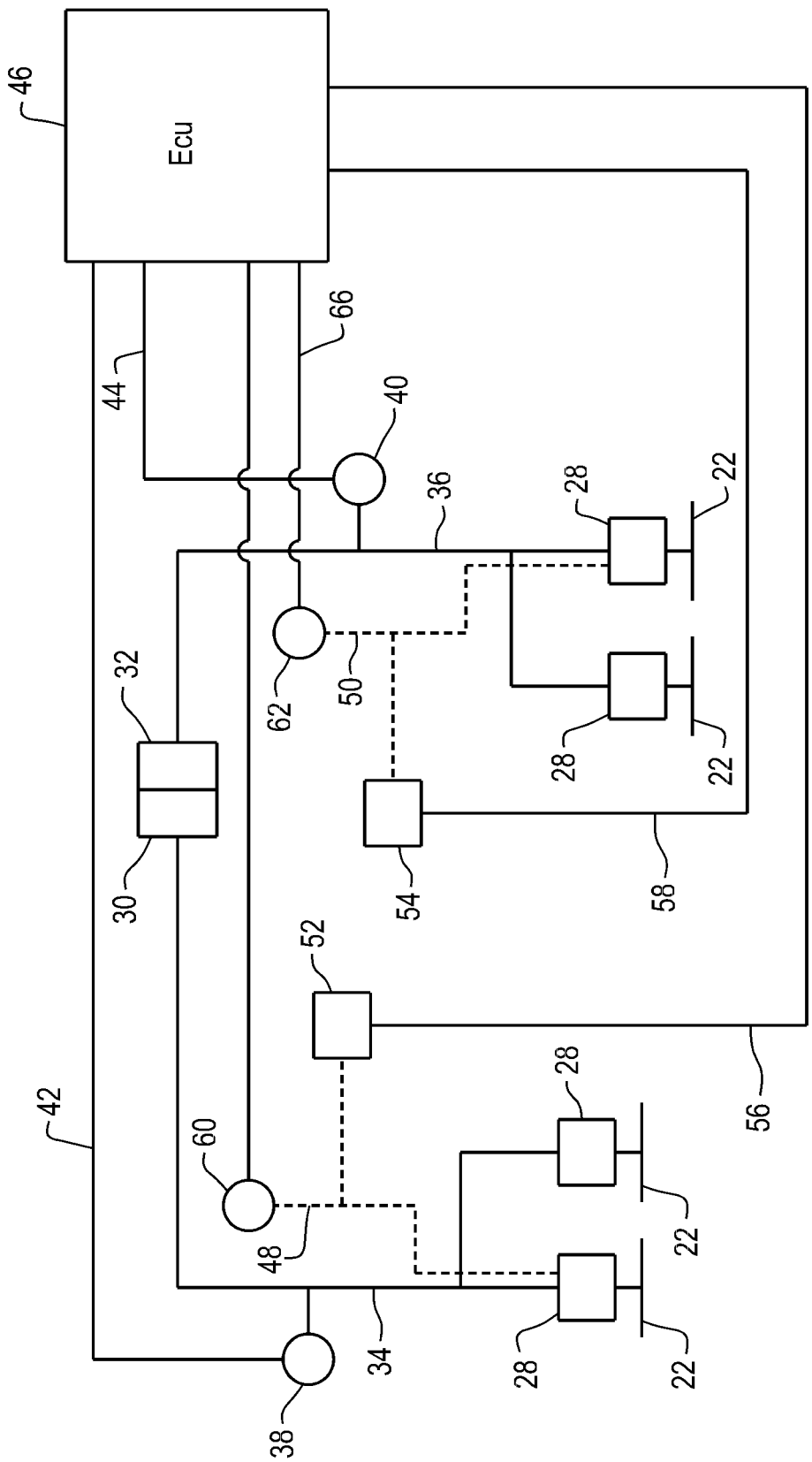

In FIG. 5, the hydraulic motors 28 each drive the base cutters 22 in their respective pairs. The motors 28 to the left are hydraulically connected to a source of hydraulic pressure 30 by line 34 in the hydraulic motors 28 on the right are connected to an independently controllable source of hydraulic fluid 32 via line 36. As stated below a pressure sensor 38 and line 34 and sensor 40 and line 36 sense motor pressure. This motor pressure is transmitted in the form of a signal through lines 42 and 44 to an electronic control unit (ECU) 46.

The motors 28 and base cutters 22 are mechanically displaceable up and down through a mechanical interconnection 48 for the left side and 50 for the right side. The displacement of the motor and base cutters 28 and 22 is sensed by component 52 for the left and component 54 for the right. The signals from these components are fed via lines 56 and 58 also to the ECU 46. The sensors 52 and 54 may take one of a number of different forms but in the present instance they may be hall effect sensors that detect rotation in the suspension for the base cutter and thus generate a signal indicating base cutter height. In addition, the mechanical interconnections 48 and 50 for the hydraulic motors and base cutters may contain load sensors 60 and 62 which are interconnected between the linkage for the base cutter and the chassis 12 of harvester 10. The signals from the load sensors 38 and 40 are fed by lines 42 and 44 to the ECU 46.

The sensors 38 and 44 detect working pressure of the motors 28 and, as described below, detect when the working pressure of the motors 28 increases beyond a threshold such as when a ground choke is encountered. The sensors 52 and 54 generate a signal proportional to the distance of the base cutters 22 above the field surface. This is used as a primary input to determine the position of the base cutters 22. The load sensors 60 and 62, which may be employed in the suspension, detect a condition of ground engagement with the between the base cutters 22 and field surface as when the load goes to zero.

Figure 3:
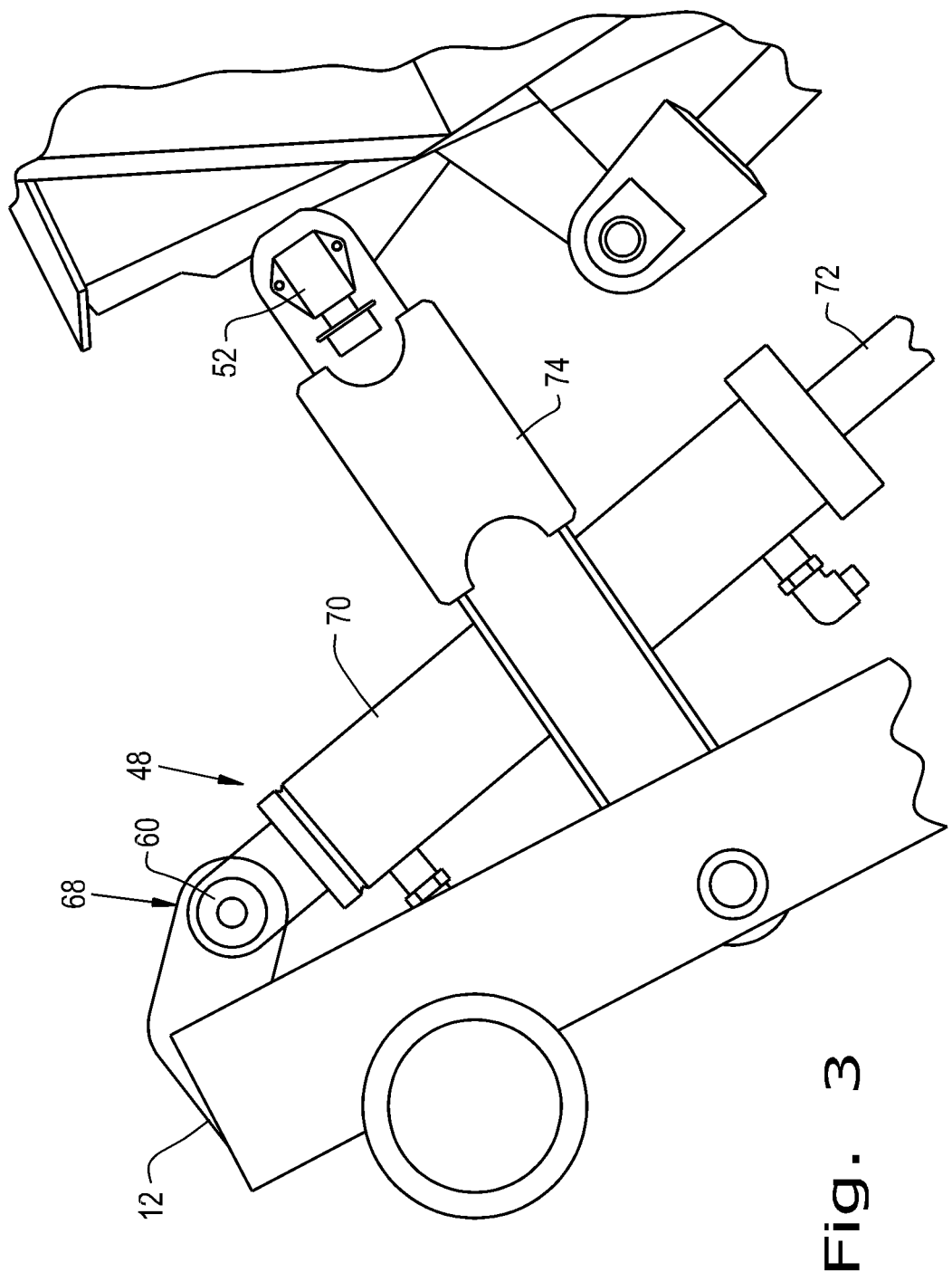
FIG. 3 is a partial side view of the sugar cane harvester of FIG. 1 showing the details of several sensors that are incorporated in the invention.

FIG. 3 shows a fragmentary side view of the suspension system 48 for one of the sets of base cutters. This suspension system is duplicated for the other of the base cutters. The suspension system includes a pivotal connection 68 to a frame member of chassis 12. Load pin sensor 60 is positioned in the pivotal connection. An actuator 70 has one end connected to the pivotal connection 68 and an output shaft 72 connected to a lift mechanism for the base cutter. The displacement sensor 52, illustrated as a Hall effect sensor, is mounted in a bracket 74 also connected to a frame element of chassis 12.

Figure 4:
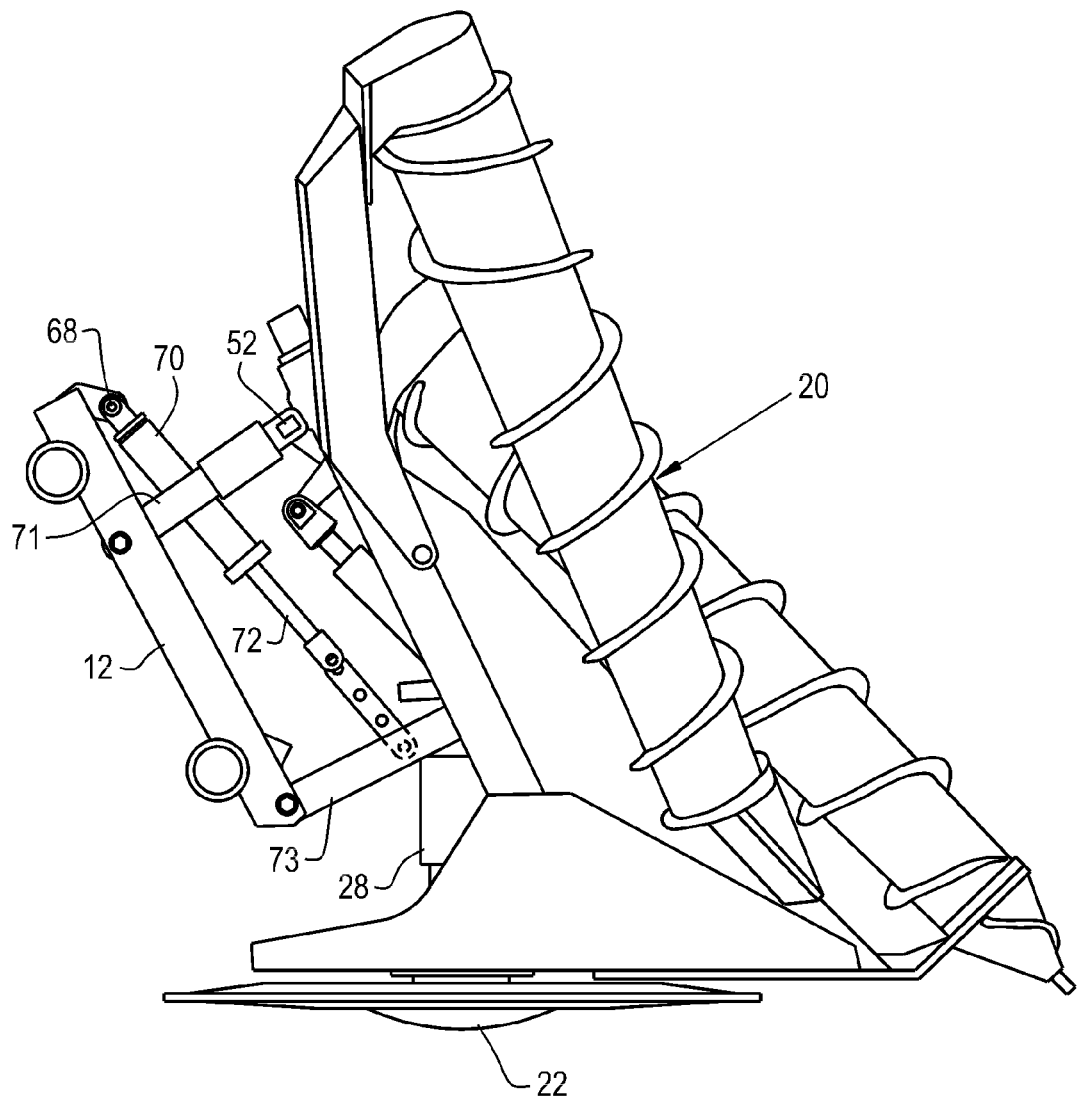
FIG. 4 is a partial side view of the harvester of FIG. 10 showing the interconnection between the harvester chassis and the movement of the base cutter; and, FIG. 5 is a schematic view of the control system for the sugarcane harvester of FIGS. 1-4.

FIG. 4 is a side view of an additional portion of the harvester that shows the addition of the row divider 20 also mounted on the chassis 12 with the actuator 70 illustrated and the output shaft 72 connected to elevate or lower the base cutter 22 and hydraulic motors 28. Substantially parallel links 71 and 73 are pivotally connected to chassis 12 and to the structure making up the row dividers 20 and base cutter 22. Thus, the sensors 52 and 54 detect changes in angles that reflect variations in the distance of the base cutters from the field surface.

The system as set forth above operates in the fashion that is illustrated in the attached additional documents. The net affect of the arrangement of the sensors and the interconnection with the ECU is to maintain the base cutter heights at the optimum preselected value independent of one another. The load sensors 60 and 62, when employed, determine whether the base cutters have hit the ground and adjust the mechanism in an upward fashion accordingly. Likewise, the pressure sensors 38 and 40 detect when a ground choke condition has occurred by a substantial increase in operating pressure of the motors 28. The displacement sensors 52 determine the height relative to the ground and independent of one another maintain the height of the base cutters in the preselected fashion in accordance with the logic set forth in the attached documents.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sugar cane harvester comprising:
   a chassis powered for movement across a field in a forward direction;
   a sugar cane row divider;
   a base cutter positioned downstream of the sugar cane row divider for severing stalks of sugar cane in individual rows;
   a linkage connected to the chassis for variably positioning the base cutter relative to a field surface;
   an actuator for variably positioning the base cutter from the field surface;
   a position sensor in the linkage to generate a signal indicating a position of the base cutter relative to the field surface;
   a controller configured to receive a signal from said position sensor for maintaining the base cutter at a preselected height; and a load sensor between the linkage and the chassis of the harvester for detecting and generating a signal representative of a load, wherein the controller is configured to determine when the signal from the load sensor drops indicating ground contact between the base cutter and the field surface for elevating the base cutter.

2. The sugar cane harvester of claim 1 including a hydraulic motor for driving the base cutter and a hydraulic system for supplying pressurized fluid individually to the motor for the base cutter and a pressure sensor sensing the working pressure of the hydraulic motor for generating a signal whenever the working pressure exceeds a predetermined level and feeding that signal to the controller for elevating the base cutter relative to the field surface.

3. A method for harvesting multiple rows of sugar cane stalks utilizing multiple base cutters, the method comprising:

positioning a base cutter independently to a given position relative to a field surface;

sensing a position of the base cutter relative to the field surface;

determining a load with a load sensor between a chassis of a sugarcane harvester and a linkage connecting the chassis to the base cutter, determining ground engagement of the base cutter with the controller and elevating the base cutter upon determining a signal representative of the load from the load sensor drops indicating around contact between the base cutter and the field surface for elevating the base cutter.

4. The method of claim 3 including the step of: using hydraulic pressure to independently drive into rotation the base cutter and sensing the operating pressure of the motor for determining choking.

\* \* \* \* \*